T. BARRON.
Apparatus for Unloading Corn from Wagons.
No. 145,779. Patented Dec. 23, 1873.
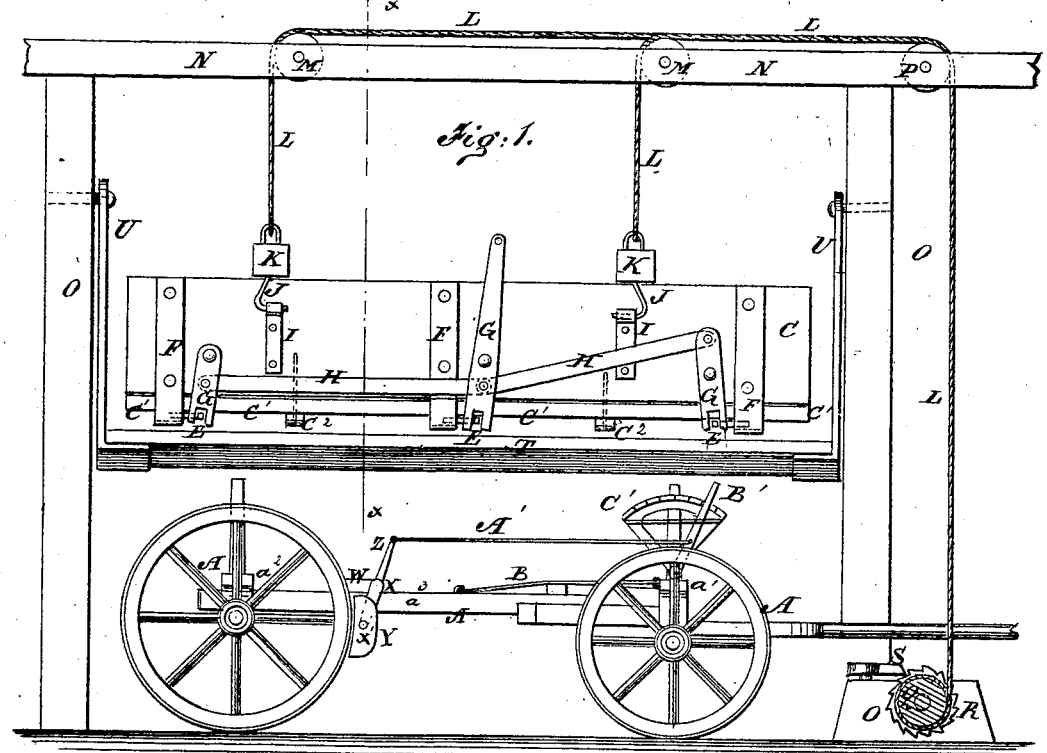
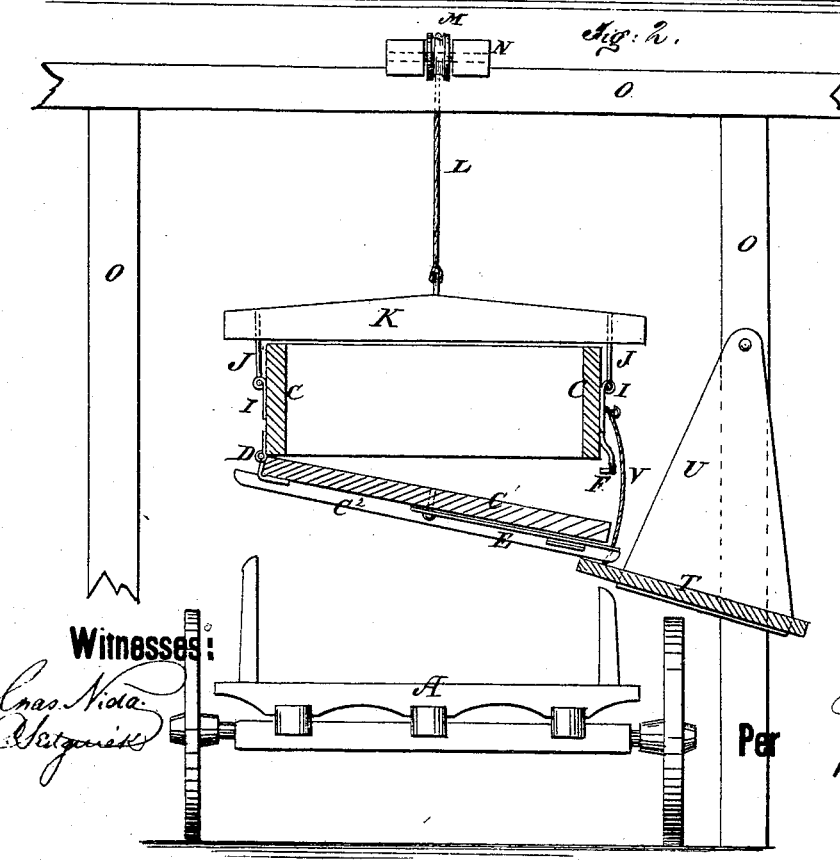
Witnesses:
Inventor:
Per
Attorneys.

UNITED STATES PATENT OFFICE.

THOMAS BARRON, OF BLACK OAK, MISSOURI.

IMPROVEMENT IN APPARATUS FOR UNLOADING CORN FROM WAGONS.

Specification forming part of Letters Patent No. 145,779, dated December 23, 1873; application filed September 13, 1873.

*To all whom it may concern:*

Be it known that I, THOMAS BARRON, of Black Oak, in the county of Caldwell and State of Missouri, have invented a new and useful Improvement in Apparatus for Unloading Corn from Wagons, of which the following is a specification:

Figure 1 is a side view of my improved apparatus. Fig. 2 is a cross-section of the same taken through the line $x\ x$, Fig. 1.

Similar letters of reference indicate corresponding parts.

My invention has for its object to furnish an improved apparatus for unloading corn from wagons, to enable the corn to be unloaded quickly and conveniently, and which shall, at the same time, be simple in construction and reliable in operation.

The invention will first be fully described, and then pointed out in the claims.

C is the wagon-box, the sides and ends of which are securely connected with each other. $c^1$ is the bottom of the wagon-box, the various parts of which are attached to two or more cross-bars, $c^2$, so that the said bottom may operate as a single piece. One edge of the bottom $c^1$ is connected with the lower edge of one of the side boards of the box C by hinges D. To the bottom $c^1$, near its other edge, are pivoted buttons E, which may be turned into catches F, attached to the side of the box C to support the bottom $c^1$ in place. Upon the outer ends of the buttons E are formed toes, to enter the forks of the levers G, which are pivoted to the side board of the box C, and are connected by bars H pivoted to them, so that they may all move together. One of the levers G projects upward, so that it may be operated by the driver; or it may have a cord attached to it, and extending to the driver's seat, for convenience in operating it. To the forward and rear parts of the side boards of the box C are attached straps I, having eyes formed in their upper ends to receive hooks J attached to cross-bars K, to the centers of which are attached the ends of the ropes L, by which they are suspended. The ropes L pass over guide-pulleys M, pivoted in slots in the beam N attached to the frame O, which is made of such a size that the loaded wagon may readily pass into it beneath the beam N, and which may be the frame of a corn-house. The ropes L pass down around a guide-pulley, P, pivoted in a slot in the beam N, and are connected with a drum, Q, pivoted to supports attached to a sill of the frame o. The drum Q is provided with a ratchet-wheel, R, and pawl S, to hold the wagon-box suspended in any position to which it may be raised. The drum Q is operated to wind up the ropes L by attaching the horses to it by means of a rope wound around it in the opposite direction from the ropes L, or by other well-known means. T is a board, having arms or plates U attached to its ends. The upper ends of the arms or plates U are pivoted to parts of the frame O in such positions that the board T may be swung beneath the locked edge of the bottom $c^1$, to form an inclined plane to guide the corn into the crib or bin as the locked edge of the bottom $c^1$ is unlocked and lowered.

The bottom $c^1$, when unlocked and lowered, is prevented from dropping too far by the short chains V attached to the box C and to the ends of the bars $c^2$.

Having thus described my invention, I claim as new and desire to secure by Letters Patent—

1. The buttons E, having toes at the outer ends, combined with a series of forked levers, G, connected by pivoted bars H, as and for the purpose specified.

2. The board T, provided with end plates U, pivoted to the frame, and combined with bottom $c^1$, as and for the purpose described.

THOMAS BARRON.

Witnesses:
   FREDERICK M. OWEN,
   THOMAS J. OWEN.